US012750773B2

(12) United States Patent
Mishra et al.

(10) Patent No.: US 12,750,773 B2
(45) Date of Patent: Sep. 29, 2026

(54) PROACTIVELY ASSIST ROAMING OF Wi-Fi 6E STATIONS WITH SMART-MANAGEMENT OF FAST BSS TRANSITION

(71) Applicant: Fortinet, Inc., Sunnyvale, CA (US)

(72) Inventors: Ruchir Mishra, Sunnyvale, CA (US); Shrikant Gambheer Patil, Sunnyvale, CA (US)

(73) Assignee: Fortinet, Inc., Sunnyvale, CA (US)

( * ) Notice: Subject to any disclaimer, the term of this patent is extended or adjusted under 35 U.S.C. 154(b) by 373 days.

(21) Appl. No.: 18/542,262

(22) Filed: Dec. 15, 2023

(65) Prior Publication Data

US 2025/0203502 A1 Jun. 19, 2025

(51) Int. Cl.

*H04W 48/20* (2009.01)
*H04B 7/06* (2006.01)
*H04B 17/318* (2015.01)
*H04W 8/00* (2009.01)
*H04W 28/02* (2009.01)
*H04W 84/12* (2009.01)

(52) U.S. Cl.

CPC .......... *H04W 48/20* (2013.01); *H04B 7/0636* (2013.01); *H04B 7/0643* (2013.01); *H04B 17/328* (2023.05); *H04W 8/005* (2013.01); *H04W 28/0226* (2013.01); *H04W 84/12* (2013.01)

(58) Field of Classification Search

CPC ............. H04W 36/00; H04W 28/0819; H04W 28/0226; H04B 7/0643; H04B 7/0636

See application file for complete search history.

(56) References Cited

U.S. PATENT DOCUMENTS

| | | | | |
|---|---|---|---|---|
| 2018/0183662 A1* | 6/2018 | Likar | .................. | H04L 41/0883 |
| 2022/0150721 A1* | 5/2022 | Zebulon | ................ | H04L 1/0015 |
| 2023/0180106 A1* | 6/2023 | Ding | ..................... | H04W 48/12 370/328 |
| 2024/0030586 A1* | 1/2024 | Lai | ....................... | H01Q 1/2266 |
| 2024/0073739 A1* | 2/2024 | Katar | .................... | H04W 28/08 |
| 2025/0048464 A1* | 2/2025 | Chu | ...................... | H04W 36/08 |

OTHER PUBLICATIONS

Feland et al., "Mobile Wi-Fi: Making Wi-Fi Work for Users on the Move", Aug. 2023, pp. 1-11 (Year: 2023).*

Correll, Perry, "IEEE 802.11kvr (802.11-2012) (Seamless & Secure Roaming)", 2019, pp. 1-41 (Year: 2019).*

* cited by examiner

*Primary Examiner* — Salvador E Rivas

(74) *Attorney, Agent, or Firm* — Law Office of Dorian Cartwright; Dorian Cartwright

(57) ABSTRACT

A Wi-Fi controller uses access point scan reports and station scan reports on a LAN to generate a global station report, and list each station with respect to an RSSI value of each nearby access point from the plurality of access points. From the global station report, proactively determines that an RSSI value for the specific Wi-Fi 6E station to at a least one preferred access point to be better than the current access point. In response, the Wi-Fi controller notifies the station via the current access point transmitting a self-initiated BTM-REQ Action frame, and also notifies the at least one preferred access point, about a proactive fast BSS transition.

13 Claims, 9 Drawing Sheets

400

PROACTIVELY ASSIST ROAMING OF Wi-Fi 6E STATIONS WITH SMART-MANAGEMENT OF FAST BSS TRANSITION

FIELD OF THE INVENTION

The invention relates generally to computer networks, and more specifically, for proactively assisting access point selection during fast BSS roaming over a wireless portion of the data communication network.

BACKGROUND

IEEE 802.11v (BSS Transition Management) is an IEEE standard which assists wireless client fast roaming (e.g., IEEE 802.11r) using RRM-neighbor-reports (e.g., IEEE 802.11k). The key factor is that a wireless client receives neighboring access point details to make a decision on roaming to a new SSID of a new access point using a fast BSS transition.

Client stations use 802.11k neighbor report information to gain information from the associated access point about potential roaming neighbors. The neighbor report information assists the fast-roaming process by providing a method for the client to request the associated access point to measure and report about neighboring access points available. This can further assist the 6 GHz roaming process by informing the client device of nearby 6 GHz access points to which it may roam. The 802.11k neighbor report information is typically delivered through a request/report action frame exchange.

The client initiates roaming with a BTM-Query frame, the wireless client has to run internal-algorithms+background scanning and compare its current signal-strength with a better available signal-strength (info of which will be available in its neighbor report) and then decide it actually wants to make a transition to other-BSSID. If yes, it will initiate a BTM-Query Action frame to it's connected access point. As evident, the 'fast-bss-transition/roaming' event is purely a client-calculation based decision, which could be slow (in a crowded environment with lots of BSSID's & high PPS packets-per-second) and will increase processing overhead on the wireless-client, due to delays it might not be able to make a quick decision. For a moving/roaming client or a client running voice-call this delay in connecting to the best-suited AP, could be significant and (if higher than 20 ms) cause discomfort to the end-user.

With the introduction of WiFi-6E standard, the need for active probing is discouraged in the 6 GHz frequency band. The traditional active scanning method is no longer efficient for initial access point discovery because client probing takes too much time because there are so many channels in the 6 GHZ band. In the absence of active Probe-REQ sent by stations in 6 GHz-band, and broadcast nature of Probe-RSP in 6 GHz-band, the 6 GHz wireless client has to only rely on passively listening to beacons and performing an 'out-of-band' discovery to know the available 6 GHz-SSID's in its vicinity. A tri-band access point can inform a Wi-Fi 6E client actively probing via beacons the 2.4 GHz or 5 GHz bands about the existing 6 GHz radio co-located in the AP, leading to reduced neighbor-reports (RNR). However, the processing time for this out-of-band discovery could be time taking in a crowded environment. The same station has to send Probe-REQ and analyze the Probe-RSP (of both 2.4 GHz and 5 GHZ bands BSSIDs) to determine the presence of a 6 GHz SSID/BSSID. Once it does that during initial connection to get connected on the 6 GHZ-SSID, it would be still required to keep doing background processing of neighbor-reports, TxBF (transmit-beamforming) and TxOp (transmit-opportunity) related calculations, etc. to determine the best-suited-neighbors always and related algorithms to make comparisons.

What is needed is a robust technique for proactively assisting access point selection during fast BSS roaming over a wireless portion of the data communication network.

SUMMARY

To meet the above-described needs, methods, computer program products, and systems for proactively assisting access point selection during fast BSS transition over a wireless portion of the data communication network.

In one embodiment, an access point module communicatively connects the Wi-Fi controller to a plurality of access points. A current access point is wirelessly connected to a Wi-Fi 6E station for access to the data communication network. The access point module on the Wi-Fi controller receives an access point scan list and a station scan report from the plurality of access points. The access point scan list identifies other access points within RF range, and associated BSSIDs and operating channels of the access points, and wherein the station scan report includes stations within RF range and associated values RSSI values relative to the stations. A station module to generate a global station report based on the access point scan lists and the station scan reports from access points, and list each station with respect to an RSSI value of each nearby access point from the plurality of access points.

In another embodiment, a preferred BSSID module to proactively determine that an RSSI value for the specific Wi-Fi 6E station to at a least one preferred access point to be better than the current access point, and in response, notify the current access point and notify the at least one preferred access point, about a proactive fast BSS transition. In response to the notification, the current access point transmits a BTM-REQ (BSS Transition Management-Request) action frame to the specific Wi-Fi 6E station, without the station initiating any BTM-Query frame. The BTM-REQ action frame includes BSSIDs and operating channel for the one or more preferred access points. The specific Wi-Fi 6E station has not yet transmitted a BTM query frame to the current access point.

In still another embodiment, the specific Wi-Fi 6E station selects a target access point from the at least one preferred access points of the BTM-REQ action frame and an internal RSSI scan table comprising RSSI values with respect to the at least one preferred access points, and the Wi-Fi 6E station transmits a BTM-RES Action frame to notify the current access point of upcoming BSS fast transition to a selected one of the at least one preferred access point. The station module updates the global station report responsive to detecting that the specific Wi-Fi 6E station has completed BSS fast roaming from the current access point to the selected one of the at least one preferred access points.

Advantageously, battery performance can be improved for mobile computing devices.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

Methods, computer program products, and systems for proactively assisting access point selection during fast BSS roaming over a wireless portion of the data communication network. The following disclosure is limited only for the purpose of conciseness, as one of ordinary skill in the art will recognize additional embodiments given the ones described herein.

Figure 2:
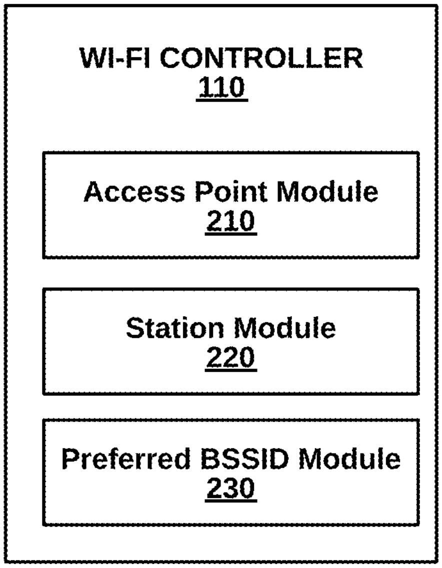
FIG. 2 is a more detailed block diagram illustrating a Wi-Fi controller of the system of FIG. 1, according to one embodiment.
Figure 3:
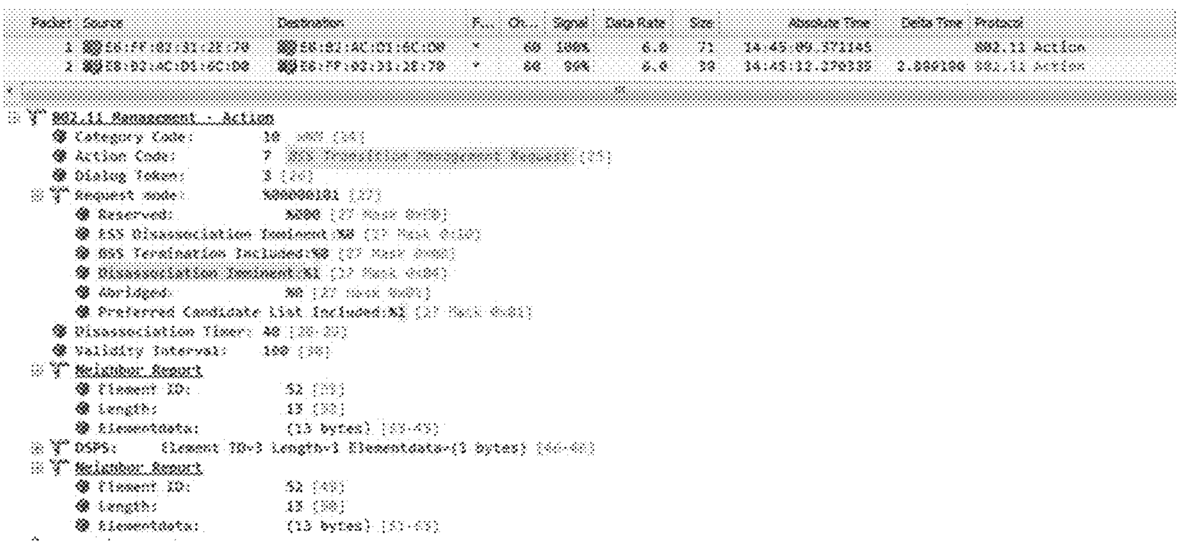
FIG. 3 is a more detailed table illustrating a BTM-REQ action frame, according to one embodiment.

I. Systems for Proactive BSS Transitions (FIGS. 1-3)

Figure 6:
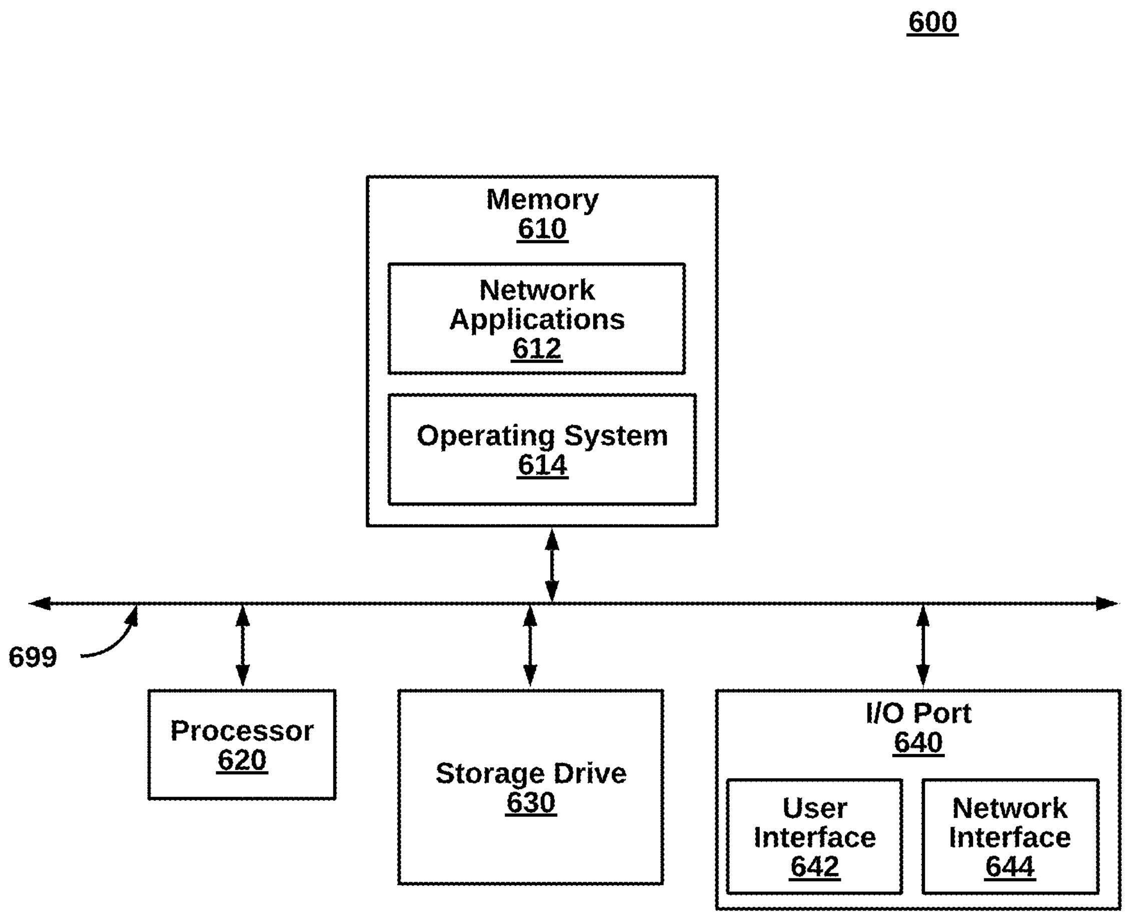
FIG. 6 is a block diagram illustrating an example computing device for the system of FIG. 1, according to one embodiment.

FIGS. 1A-D are high-level block diagrams illustrating a system 100 for proactively assisting access point selection during fast BSS roaming over a wireless portion of the data communication network, according to an embodiment. The system 100 includes a Wi-Fi controller 110, Wi-Fi 6E access points 120A, 120B, 120C and a Wi-Fi 6E station 130. Other embodiments of the system 100 can include additional components that are not shown in FIG. 1, such as routers, switches, network gateways, and firewalls, as well as additional access points and stations (e.g., Wi-Fi 6E stations, non Wi-Fi 6E stations, future protocol stations, and legacy protocol stations) are also possible. For example, the system 100 of FIG. 1 shows one station and three access points, however, other examples have hundreds of stations connected to access points distributed over different LANs. The components of system 100 can be implemented in hardware, software, or a combination of both. An example implementation is shown in FIG. 6. Generally, system 100 collects information in FIG. 1B, distributes instructions in FIG. 1C, and observes resulting change in FIG. 1D.

In one embodiment, the components of the system 100 are coupled in communication over a private network connected to a public network, such as the Internet. In another embodiment, system 100 is an isolated, private network, or alternatively, a set of geographically dispersed LANs. The components can be connected to the data communication system 199 via hard wire (e.g., Wi-Fi controller 110 and Wi-Fi 6E access points 120A, 120B, 120C). The components can also be connected via wireless networking (e.g., Wi-Fi 6E station 130). The data communication network 199 can be composed of any combination of hybrid networks, such as an SDWAN, an SDN (Software Defined Network), WAN, a LAN, a WLAN, a Wi-Fi network, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, 802.11be, Wi-Fi 6, Wi-Fi 6E, Wi-Fi 7 and the like. Components can use IPV4 or IPV6 address spaces.

One embodiment of the system 100 in operation is described in the following twelve steps, as a non-limiting example:

1. The Wi-Fi 6E access point 110 performs a background/foreground scan (at every scan-interval) and each access point reports the scan-list to the WiFi-Controller 110;
2. The content of scan-reports are: Nearby BSSID list, it's respective SSID, RSSI value of each of them, and operating channel of each BSSID;
3. Similar to #apscan report, #stascan report, containing scanned station MAC addresses present in the vicinity of the respective access point, is also generated at the Wi-Fi 6E access points 120A-C and sent to the WiFi-Controller 110;
4. The #stascan list contains RSSI/signal-strength of each-station with respect to each neighboring BSSID;
4. With the information generated from #apscan and #stascan o/p, the WiFi-Controller 110 runs a comparison-check, to determine if the current RSSI of station 130 on its connected BSSID1 of the access point 120A is the best; or if the same SSID deployed on another access point 120B or access point 120C, broadcasting BSSID2 and BSSID3, are better;
5. In case, a specific 802.11k,v,r supported station (capabilities of which are already present with the WiFi-controller 110) is connected on BSSID1 with RSSI: −x dBm (−55 dBm);
6. If for the same SSID, on another access point, BSSID2 with RSSI: −y dBm (−45 dBm);
7. Calculation done to identify a potential better access point: If −x<−y;
8. If a better connection is available and actionable, the access point 110A will initiate a BTM-REQ Action-frame to the respective station 130 (without expecting the station 130 to send a BTM-Query Action-frame first);
9. This BTM-REQ Action-frame will have a neighbor-report and preferred candidate-list (preferred access point) included;
10. In the BTM-Response Action-frame, the station 130 reverts with the new target-BSSID of the access point 120B/BSSID2 for which is initiate an 802.11r 'fast-bss-transition';
11. Once station 120A roaming to access point 120B from access point 120A is completed, the entire cycle will continue occurring in the background for more BSS transitions as conditions change;
12. Hence, the Wi-Fi controller 110 has proactively assisted the station 130 during roaming by drastically reducing overhead of calculating best BSSID from neighbor-reports prior to each roam-instance.

In another embodiment of the system 100, the Wi-Fi controller 110 proactively prepares information needed by stations roaming the data communication network 100. This offloading of processing resources saves battery power for mobile devices. In more detail, a global station report from the station status reports and access point scan reports sent upstream to a centralized part of the network. Each station can be seen by multiple access points, each indicating a different signal strength in relation to each station, in some embodiments, indicated by an RSSI value. The RSSI values can be measured passively or actively. However, in some network environments, traffic congestion is relieved by restricting active probing for measuring RSSI values from a station. Active probing also uses battery and processing resources, that are offloaded to the Wi-Fi controller 110.

Thus, in an embodiment, the Wi-Fi controller 110 selects preferred BSSIDs from the global station report. The selection can initiated by a degradation of RSSI values for a connection between the access point 120A and the station 130 over two or more consecutive station status reports. In turn, the Wi-Fi controller 110 may identify a more ideal connection (e.g., a higher RSSI value, or increasing RSSI value over subsequent station status reports). In some implementations, additional factors are considered in combination with RSSI values. Ultimately, the station 130 makes a decision, in view of steering to BSSIDs that are preferred by the Wi-Fi controller 110. By providing pre-processed information in the form of preferred BSSIDs, the Wi-Fi controller 110 can potentially speed up BSS transitions during roaming. Moreover, network traffic is reduced and active probing is avoided.

Figure 1A:
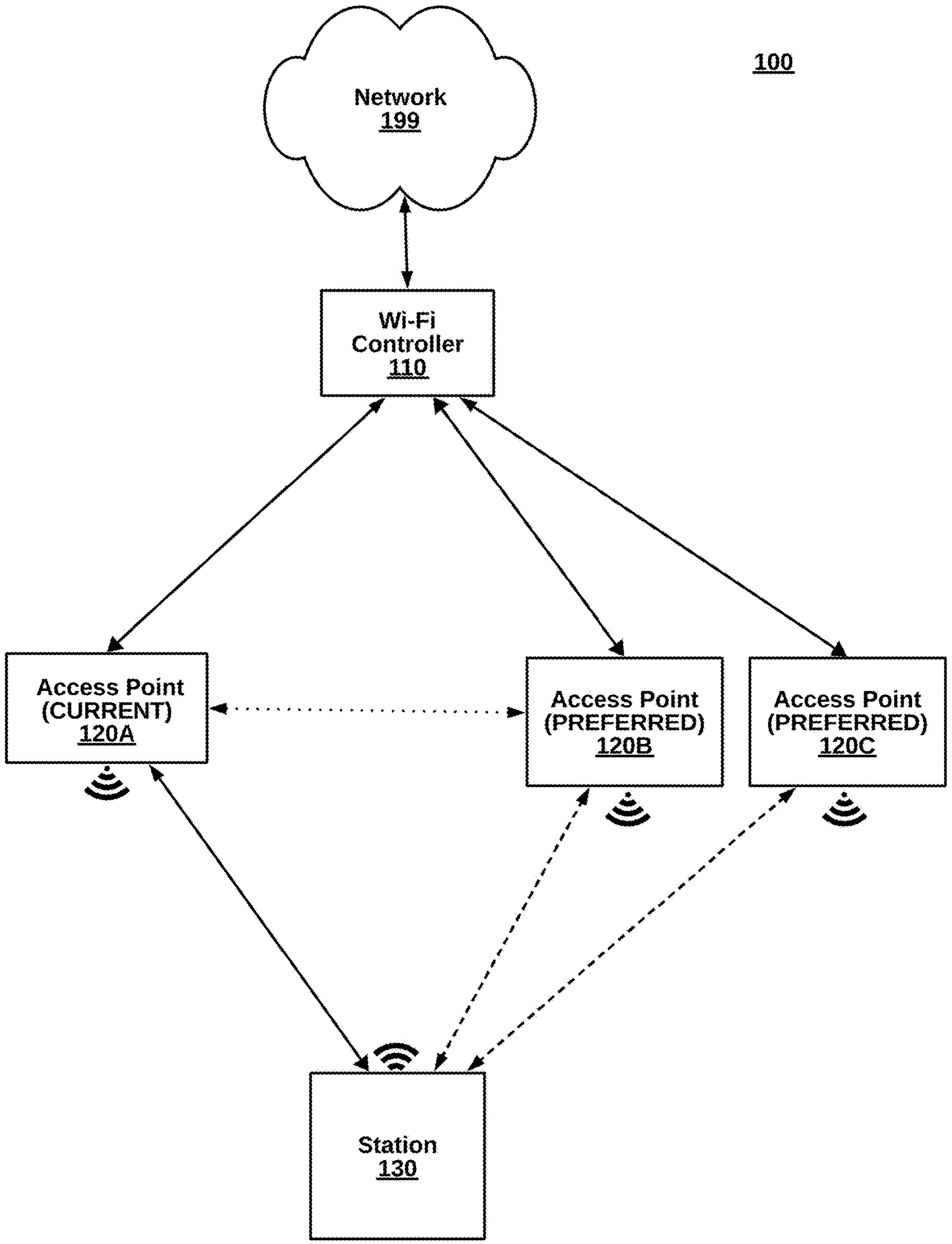
FIGS. 1A-1D are high-level block diagrams illustrating aspects of a system coordinating for proactively assisting access point selection during fast BSS roaming over a wireless portion of the data communication network, according to some embodiments.
Figure 1B:
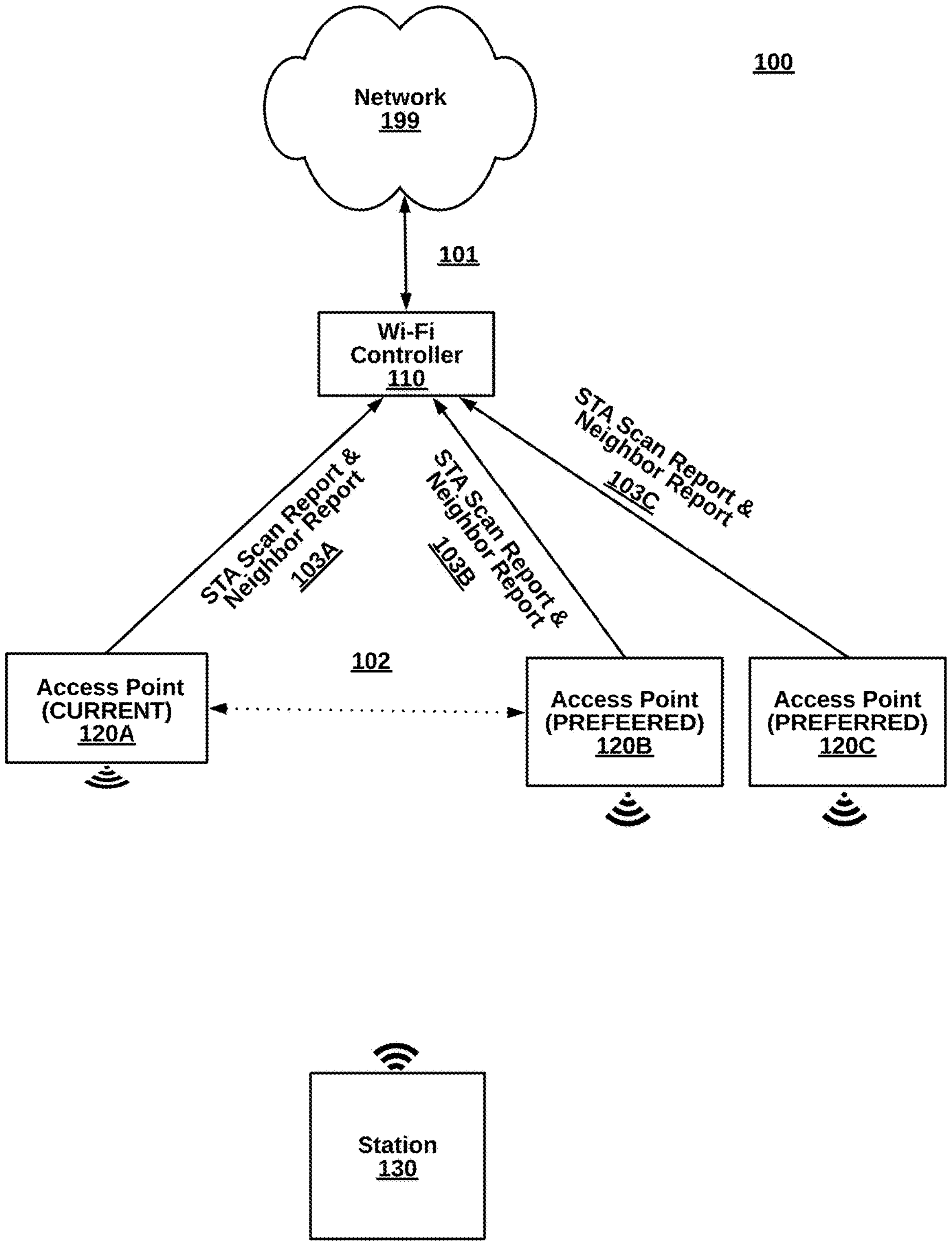

The Wi-Fi access points 120A-C each provide local data that is aggregated by the Wi-Fi controller 110 (see FIG. 1B). Access point scan reports (or neighbor reports) are generated by listening to other data traffic within RF range of an access point, although not designated for the snooping access point. A parser exposes meta data indicating a BSSID an operating channel of a nearby access point. RSSI values of different data packets associated with the same snooped access point can help in estimating a location or distance away from another access point.

A station status report can also be compiled from snooping data packets, in addition to listing the connected stations. Data packets received from access points and stations are measured for an RSSI value. Stations, along with MAC address, IP address, and the like, are listed in the station status report, transmitted upstream to the Wi-Fi controller 110 by each of the access points 120A-C.

Figure 1C:
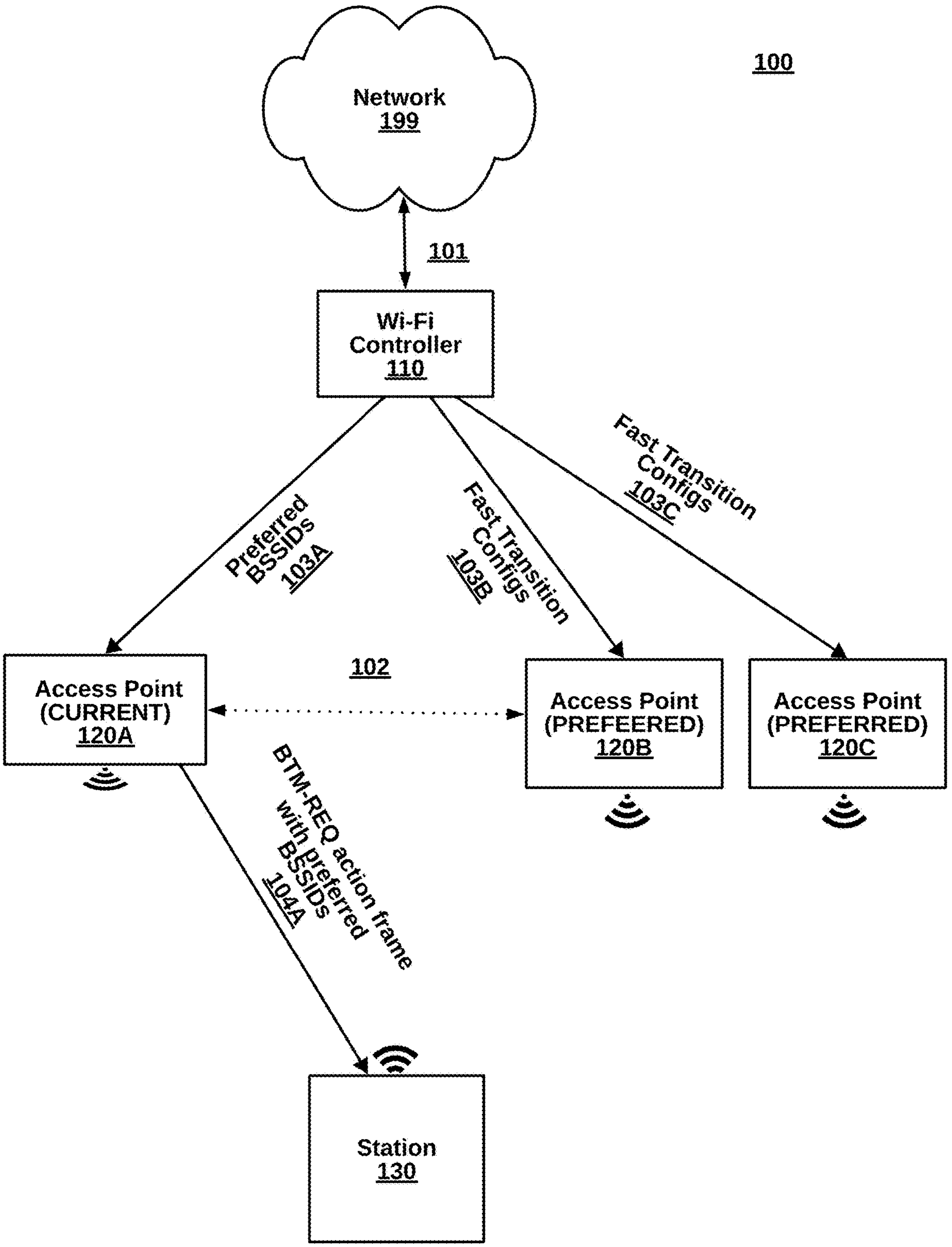
Figure 1D:
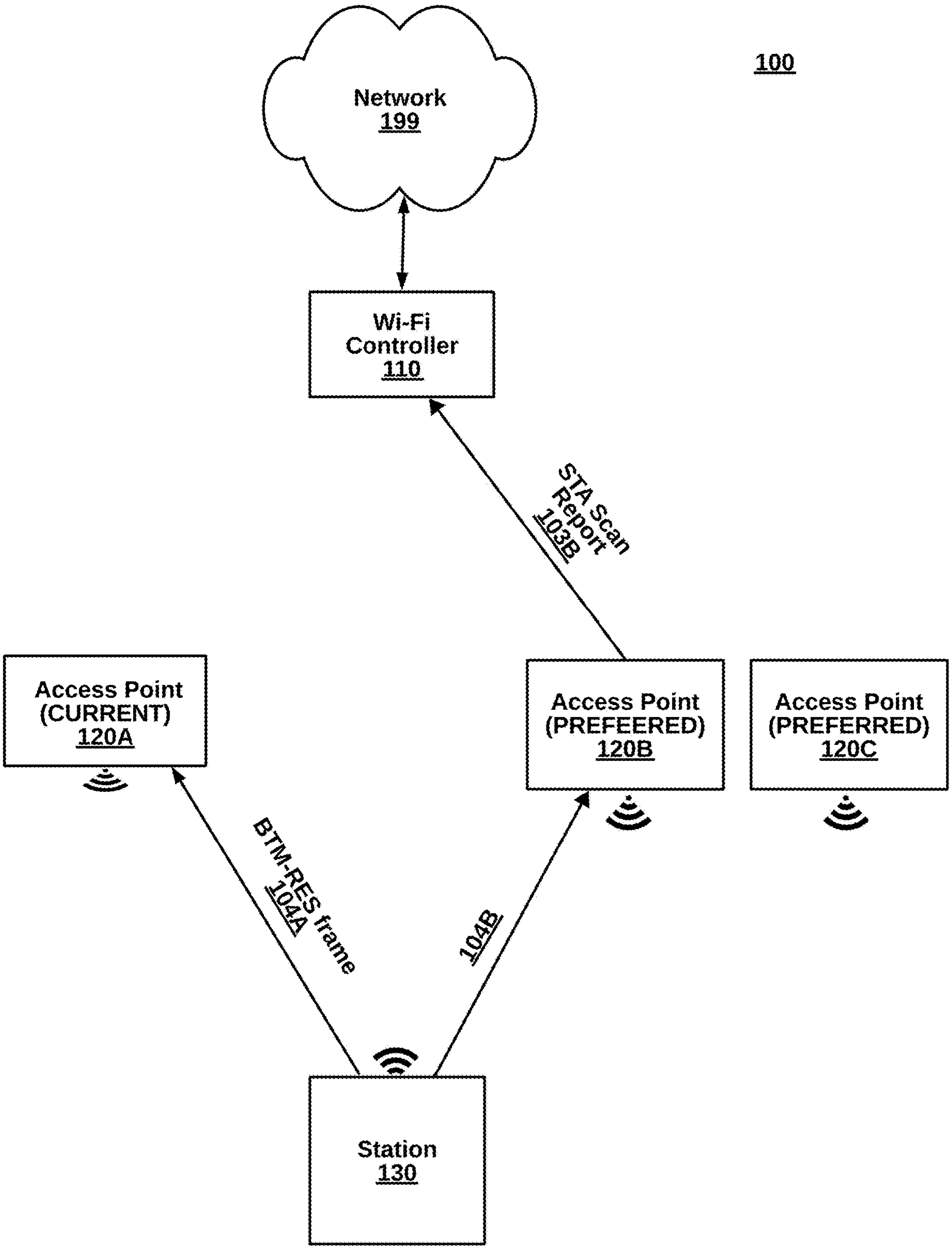

The Wi-Fi access points 120A-C, upon direction of the Wi-Fi access point 110, generate a BTM-Action Req frame to proactively provide BSS roaming data to the station 130, without having to compile a BTM-Query frame (see FIG. 1C). One embodiment sets a value for an imminent disassociation field to indicate that the station 130 will be forcibly removed from receiving network service, and therefore, the station 130 is compelled to immediately roam to continue a network connection. Another embodiment further provides a preferred list of BSSID for service. Conventionally, neighbor reports are not provided until requested by the station 130.

The station 130 connects to nearby access points over wireless channels for uploading and downloading data from the data communication network. From time-to-time, the station 130 roams from one access point to a different access point, often due to a better RSSI signal being available. However, the stations 130 operating under the Wi-Fi 6E standard are restrained from using active probing to gather information on nearby BSSIDs. In some embodiments, the station 130 can be a mobile device, an IoT device, or other power saving type of device that benefits from the preprocessed roaming information.

In response to the current access point notification, the Wi-Fi 6E station 130 selects a target access point from the at least one preferred access points of the BTM-REQ action frame and an internal RSSI scan table comprising RSSI values with respect to the at least one preferred access points. Then the Wi-Fi 6E station 130 transmits a BTM-RES frame to notify the current access point 120A of upcoming BSS fast transition to a selected one of the at least one preferred access point.

FIG. 2 is a more detailed block diagram illustrating the Wi-Fi controller 110 of the system of FIG. 1, according to one embodiment. The Wi-Fi controller 110 includes an access point module 210, a station module 220 and a preferred BSSID module 230. The components can be implemented in hardware, software, or a combination of both.

The access point module 210 communicatively connecting the Wi-Fi controller to a plurality of access points, wherein a current access point is wirelessly connected to a Wi-Fi 6E station for access to the data communication network. The access point module 210 can receive an access point scan list and a station scan report from the plurality of access points. The access point scan list identifies other access points within RF range, and associated BSSIDs and operating channels of the access points. The station scan report includes stations within RF range and associated values RSSI values relative to the stations.

A station module 220 can generate and maintain a global station report based on the access point scan lists and the station scan reports from access points. The global scan report can list each station with respect to an RSSI value of each nearby access point from the plurality of access points.

The preferred BSSID module 230 can proactively determine that an RSSI value for the specific Wi-Fi 6E station to at a least one preferred access point to be better than the current access point. The access point module 210 notifies the current access point for indirect control of stations, and also notifies the at least one preferred access point for preparing a new connection (e.g., per fast BSS transitions under IEEE 802.11r). In additional embodiments, the global station report is updated responsive to detecting that the specific Wi-Fi 6E station has completed BSS fast roaming from the current access point to the selected one of the at least one preferred access points.

II. Methods for Proactive BSS Transitions (FIGS. 4-5)

Figure 4:
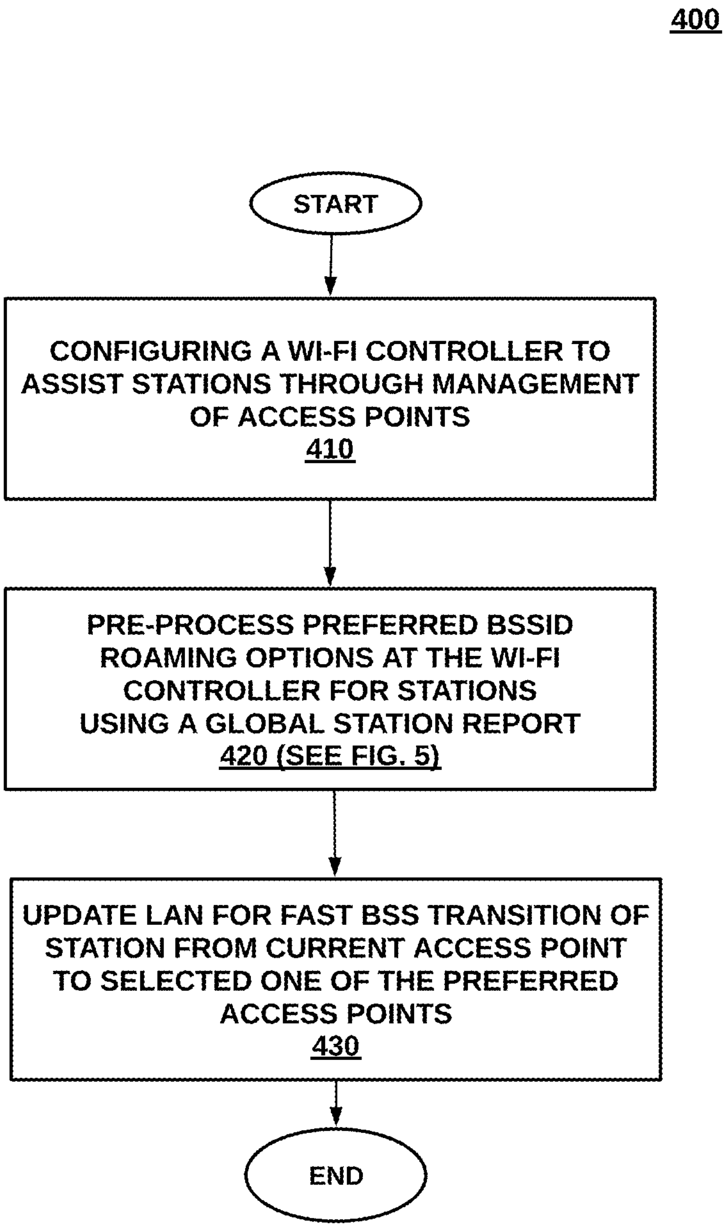
FIG. 4 is a high-level flow diagram illustrating a method for proactively assisting access point selection during fast BSS roaming over a wireless portion of the data communication network, according to an embodiment.

FIG. 4 is a high-level flow diagram of a method 400 for connecting stations in a multiple Wi-Fi 6E access point network architecture, according to an embodiment. The method 400 can be implemented by, for example, system 100 of FIG. 1. The specific grouping of functionalities and order of steps are a mere example as many other variations of method 400 are possible, within the spirit of the present disclosure.

Specifically, at step 410, a Wi-Fi controller is communicatively connected over a LAN to manage a plurality of access points. A current access point is wirelessly connected to a Wi-Fi 6E station (and other stations) for access to the data communication network. As a result, the Wi-Fi controller is able to indirectly manage the stations through the access points, with respect to preferred BSSID roaming and many other processes. At step 420, preferred BSSID roaming options are pre-processed for stations using a global station report, as described in more detail in association with FIG. 5. At step 430, a station selects one of the preferred BSSID roaming options based on an internal scan table of RSSI values. The RSSI values can be provided by the Wi-Fi controller to the station in other cases. Then the station roams from a current station to a selected one of the preferred station, preferably using a fast BSS transition process.

Figure 5:
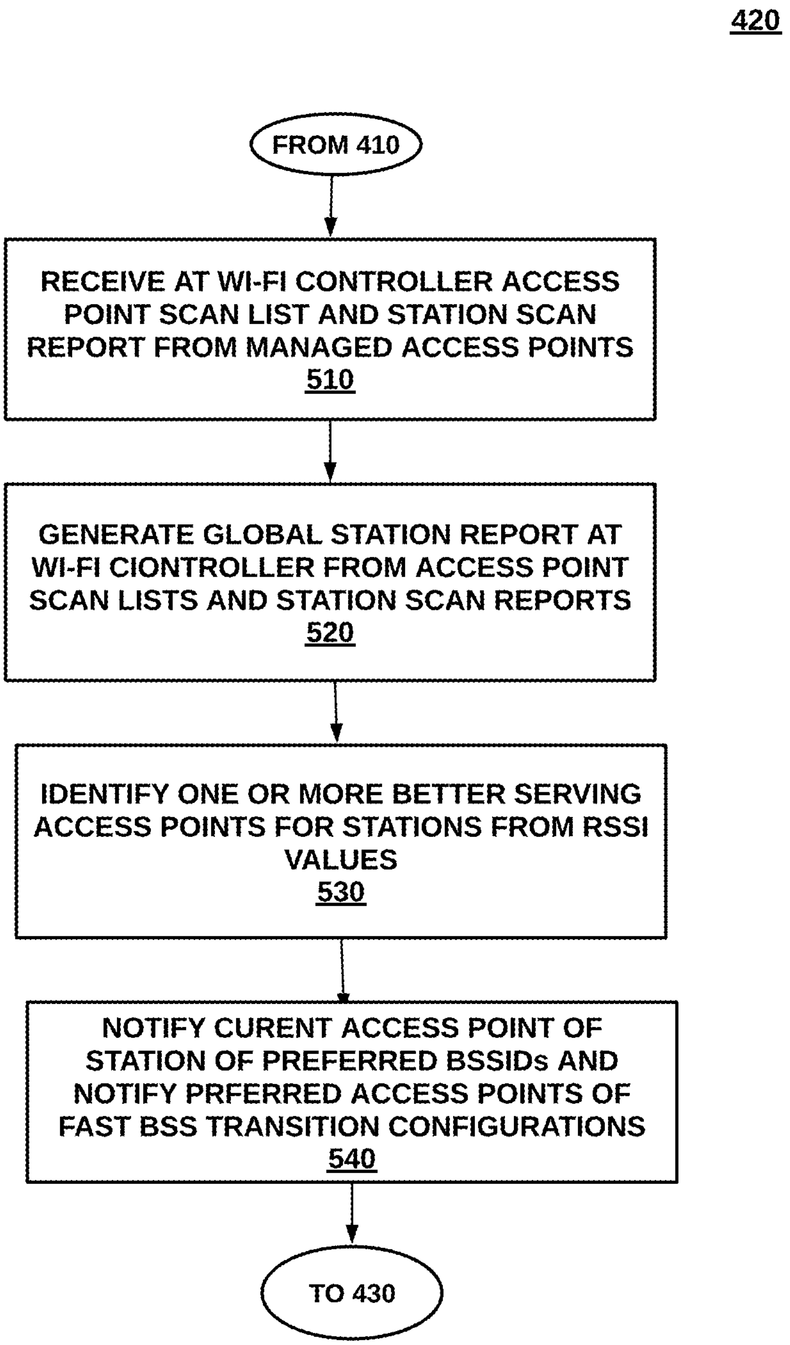
FIG. 5 is a more detailed flow diagram illustrating a step for pre-processing preferred BSSID roaming options using a global station report, from the method of FIG. 4, according to one embodiment.

FIG. 5 is a more detailed flow diagram detailing the step 420 of pre-processing preferred BSSID roaming options using a global station report. Other variations are possible for different implementations.

At step 510, an access point scan list and a station scan report are received at the Wi-Fi controller from the plurality of access points. The access point scan list identifies other access points within RF range, and associated BSSIDs and operating channels of the access points. The station scan report includes stations within RF range and associated values RSSI values relative to the stations.

At step 520, a global station report is generated at the Wi-Fi controller based on the access point scan lists and the station scan reports from access points. Each station is listed with respect to an RSSI value of each nearby access point from the plurality of access points. In an embodiment, the global station report is updated responsive to detecting that a Wi-Fi 6E station has completed BSS fast roaming from a current access point to the selected one of the at least one preferred access points. In one example, hundreds of stations are tracked while roaming across multiple associated LANs.

At step 530, it is proactively determined, at the Wi-Fi controller, that an RSSI value for the specific Wi-Fi 6E station to at a least one preferred access point to be better than the current access point. In one embodiment, the determination is static, being based on absolute RSSI comparison between available access points. In another embodiment, the determination is dynamic, based on sequential station reports.

Either way, at step 540, in response to the identification of better access point connections, the Wi-Fi controller causes the station to select one of preferred BSSIDs through the current access point. In one embodiment, RSSI values associated with the BSSIDs are also sent downstream. To reach the stations, the Wi-Fi controller sends downstream a list of preferred BSSIDs and respective operating channel information that are repackaged in a BTM-REQ action frame by a current access point and sent further downstream to the station. Further, the at least one preferred access point is notified about a potential fast BSS transition from the station. In some implementations, a probability threshold that the fast BSS transition will actually occur (e.g., based on movement pattern of a station, historical connections of a station, or network conditions affecting a station), must be exceeded before sending BSS transition data downstream.

III. Computing Device for Proactive BSS Transitions (FIG. 6)

FIG. 6 is a block diagram illustrating a computing device 600 for use in the system 100 of FIG. 1, according to one embodiment. The computing device 600 is a non-limiting example device for implementing each of the components of the system 100, including the Wi-Fi controller 110, the Wi-Fi 6E access points 120A, 120B, 120C and the station 130. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. Network access applications can include 612 a web browser, a mobile access application, an access application that uses networking, a remote access application executing locally, a network protocol access application, a network management access application, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C #, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but is not limited to, layer 2/3 routing, content inspection, content filtering, firewall, traffic shaping, application control, Voice over Internet Protocol (VOIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTI Wi-Fi family of wireless security gateways), FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

We claim:

1. A computer-implemented method in a Wi-Fi controller on a data communication network, for proactively assisting access point selection during fast BSS roaming over a wireless portion of the data communication network, the method comprising:

communicatively connecting the Wi-Fi controller to a plurality of access points, wherein a current access point is wirelessly connected to a Wi-Fi 6E station for access to the data communication network;

receiving, at the Wi-Fi controller, an access point scan list and a station scan report from the plurality of access points, wherein the access point scan list identifies other access points within RF range, and associated BSSIDs and operating channels of the access points, and wherein the station scan report includes stations within RF range and associated RSSI values relative to the stations;

generating, at the Wi-Fi controller, a global station report based on the access point scan lists and the station scan reports from access points, and listing each station with respect to an RSSI value of each nearby access point from the plurality of access points;

proactively determining, at the Wi-Fi controller, from the global station report and before receiving any BTM query frame from the specific Wi-Fi 6E station for the proactive fast BSS transition, that an RSSI value for the specific Wi-Fi 6E station relative to at least one preferred access point better than the current access point, and in response, the Wi-Fi controller notifying the current access point and notifying the at least one preferred access point, about a proactive fast BSS transition, wherein, in response to the notification from the Wi-Fi controller, and not in response to receiving a BTM query frame from the specific Wi-Fi 6E station, the current access point transmits a BTM-REQ (BSS Transition Management-Request) action frame to the specific Wi-Fi 6E station, wherein the BTM-REQ action frame includes BSSIDs and respective operating channel information for the one or more preferred access points, and wherein the specific Wi-Fi 6E station has not yet transmitted a BTM query frame to the current access point for the proactive fast BSS transition, and wherein the specific Wi-Fi 6E station selects a target access point from the at least one preferred access points of the BIM-REQ action frame and an internal RSSI scan table comprising RSSI values with respect to the at least one preferred access points, and the Wi-Fi 6E station transmits a BTM-RES frame to notify the current access point of upcoming BSS fast transition to a selected one of the at least one preferred access point; and updating the global station report responsive to detecting that the specific Wi-Fi 6E station has completed BSS fast roaming from the current access point to the selected one of the at least one preferred access points.

2. The method of claim 1, wherein the BTM-REQ action frame comprises an imminent disassociation field set by the current access point to indicate an upcoming disassociation of the specific Wi-Fi 6E station from the current access point.

3. The method of claim 1, wherein the specific Wi-Fi 6E station performs BSS fast roaming according to IEEE 802.11r.

4. The method of claim 1, wherein the access point transmits a BIM-REQ action frame according to IEEE 802.11v.

5. The method of claim 1, wherein the step of protectively determining a better RSSI value comprises comparing BSSID values between different access points from an individual instance of the global station report.

6. The method of claim 1, wherein the step of protectively determining a better RSSI value comprises comparing RSSI values of the current access point over sequential instances of the global station report.

7. A non-transitory computer-readable medium, storing computer-executable instructions in a Wi-Fi controller on a data communication network that, when executed by a processor, perform a method for proactively assisting access point selection during fast BSS roaming over a wireless portion of the data communication network, the method comprising:

communicatively connecting the Wi-Fi controller to a plurality of access points, wherein a current access point is wirelessly connected to a Wi-Fi 6E station for access to the data communication network;

receiving, at the Wi-Fi controller, an access point scan list and a station scan report from the plurality of access points, wherein the access point scan list identifies other access points within RF range, and associated BSSIDs and operating channels of the access points, and wherein the station scan report includes stations within RF range and associated RSSI values relative to the stations;

generating, at the Wi-Fi controller, a global station report based on the access point scan lists and the station scan reports from access points, and listing each station with respect to an RSSI value of each nearby access point from the plurality of access points;

proactively determining, at the Wi-Fi controller, from the global station report and before receiving any BTM query frame from the specific Wi-Fi 6E station for the proactive fast BSS transition, that an RSSI value for the specific Wi-Fi 6E station relative to at least one preferred access point better than the current access point, and in response, the Wi-Fi controller notifying the current access point and notifying the at least one preferred access point, about a proactive fast BSS transition, wherein, in response to the notification from the Wi-Fi controller, and not in response to receiving a BTM query frame from the specific Wi-Fi 6E station, the current access point transmits a BTM-REQ (BSS Transition Management-Request) action frame to the specific Wi-Fi 6E station, wherein the BTM-REQ action frame includes BSSIDs and respective operating channel information for the one or more preferred access points, and wherein the specific Wi-Fi 6E station has not yet transmitted a BTM query frame to the current access point for the proactive fast BSS transition, and wherein the specific Wi-Fi 6E station selects a target access point from the at least one preferred access points of the BTM-REQ action frame and an internal RSSI scan table comprising RSSI values with respect to the at least one preferred access points, and the Wi-Fi 6E station transmits a BTM-RES frame to notify the current access point of upcoming BSS fast transition to a selected one of the at least one preferred access point; and updating the global station report responsive to detecting that the specific Wi-Fi 6E station has completed BSS fast roaming from the current access point to the selected one of the at least one preferred access points.

8. The method of claim 7, wherein the BTM-REQ action frame comprises an imminent disassociation field set by the current access point to indicate an upcoming disassociation of the specific Wi-Fi 6E station from the current access point.

9. The method of claim 7, wherein the specific Wi-Fi 6E station performs BSS fast roaming according to IEEE 802.11r.

10. The method of claim 7, wherein the access point transmits a BTM-REQ action frame according to IEEE 802.11v.

11. The method of claim 7, wherein the step of protectively determining a better RSSI value comprises comparing BSSID values between different access points from an individual instance of the global station report.

12. The method of claim 7, wherein the step of protectively determining a better RSSI value comprises comparing RSSI values of the current access point over sequential instances of the global station report.

13. A Wi-Fi controller on a data communication network, for proactively assisting access point selection during fast BSS roaming over a wireless portion of the data communication network, the Wi-Fi controller comprising:

a processor;

a network interface communicatively coupled to the processor and to a data communication network; and a memory, communicatively coupled to the processor and storing:

communicatively connect the Wi-Fi controller to a plurality of access points, wherein a current access point is wirelessly connected to a Wi-Fi 6E station for access to the data communication network, receive an access point scan list and a station scan report from the plurality of access points, wherein the access point scan list identifies other access points within RF range, and associated BSSIDs and operating channels of the access points, and wherein the station scan report includes stations within RF range and associated RSSI values relative to the stations;

generate a global station report based on the access point scan lists and the station scan reports from access points, and list each station with respect to an RSSI value of each nearby access point from the plurality of access points; and proactively determine that an RSSI value for the specific Wi-Fi 6E station to at a least one preferred access point to be better than the current access point, and in response, notify the current access point and notify the at least one preferred access point, about a proactive fast BSS transition, wherein, in response to the notification from the Wi-Fi controller, and not in response to receiving a BTM query frame from the specific Wi-Fi 6E station, the current access point transmits a BTM-REQ (BSS Transition Management-Request) action frame to the specific Wi-Fi 6E station, wherein the BTM-REQ action frame includes BSSIDs and respective operating channel information for the one or more preferred access points, and wherein the specific Wi-Fi 6E station has not yet transmitted a BTM query frame to the current access point for the proactive fast BSS transition, and wherein the specific Wi-Fi 6E station selects a target access point from the at least one preferred access points of the BTM-REQ action frame and an internal RSSI scan table comprising RSSI values with respect to the at least one preferred access points, and the Wi-Fi 6E station transmits a BTM-RES frame to notify the current access point of upcoming BSS fast transition to a selected one of the at least one preferred access point; and update the global station report responsive to detecting that the specific Wi-Fi 6E station has completed BSS fast roaming from the current access point to the selected one of the at least one preferred access points.

* * * * *